July 19, 1966 F. G. THIELE 3,261,369
VEHICLE CLEANING APPARATUS
Filed July 13, 1964 3 Sheets-Sheet 1
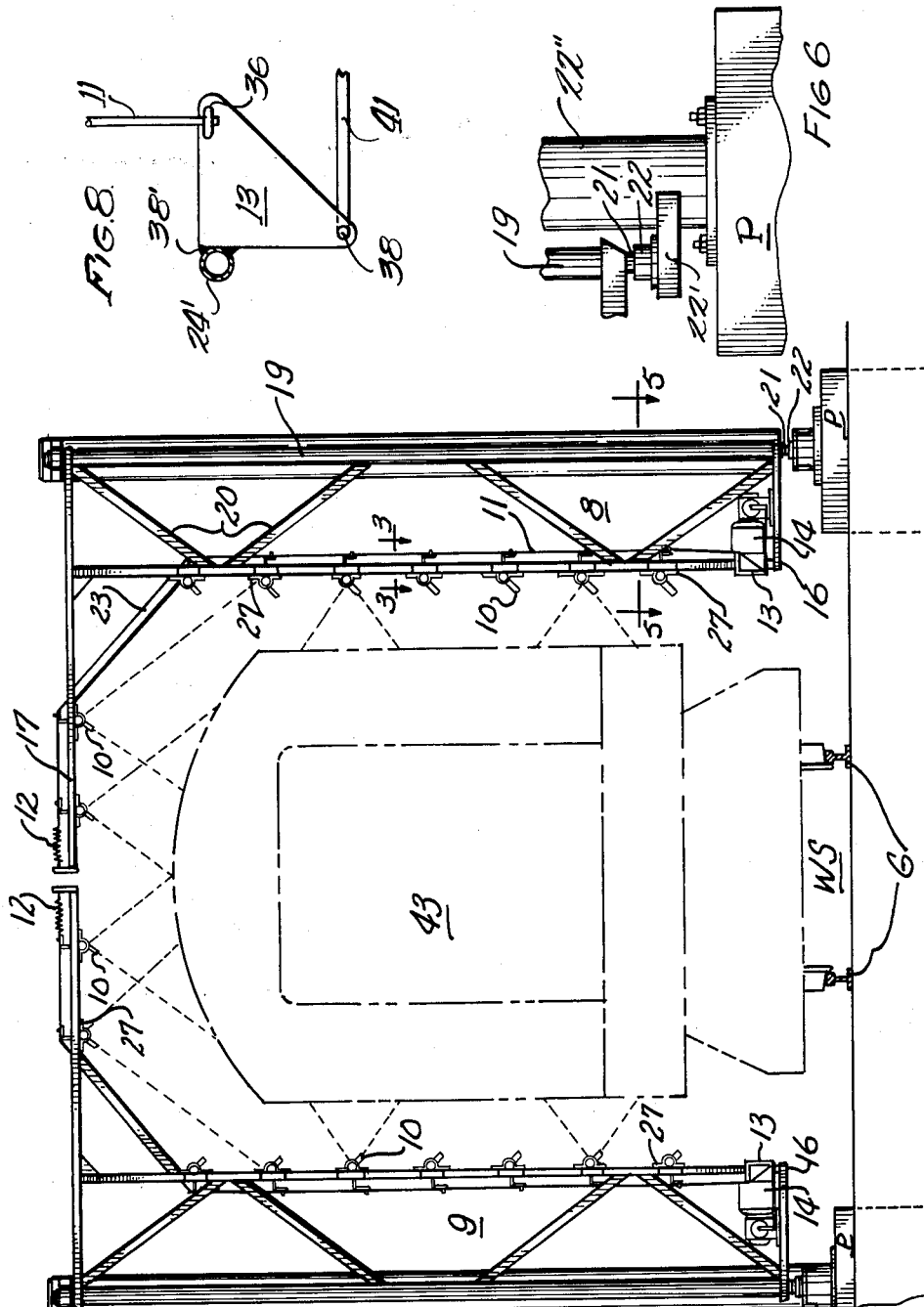
INVENTOR.
Francis G. Thiele
BY
Rummler and Snow
Atty's

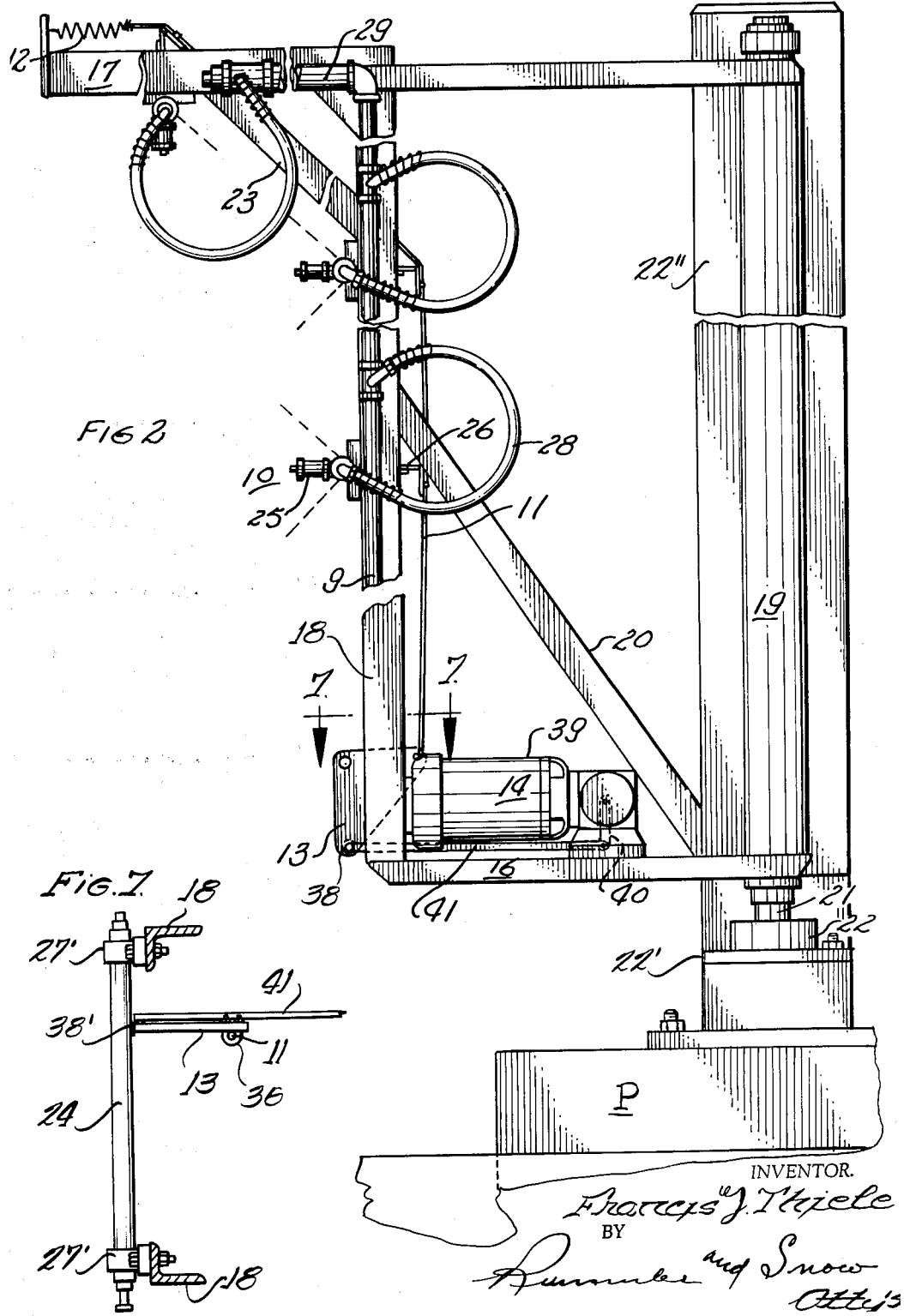

July 19, 1966  F. G. THIELE  3,261,369
VEHICLE CLEANING APPARATUS
Filed July 13, 1964  3 Sheets-Sheet 3
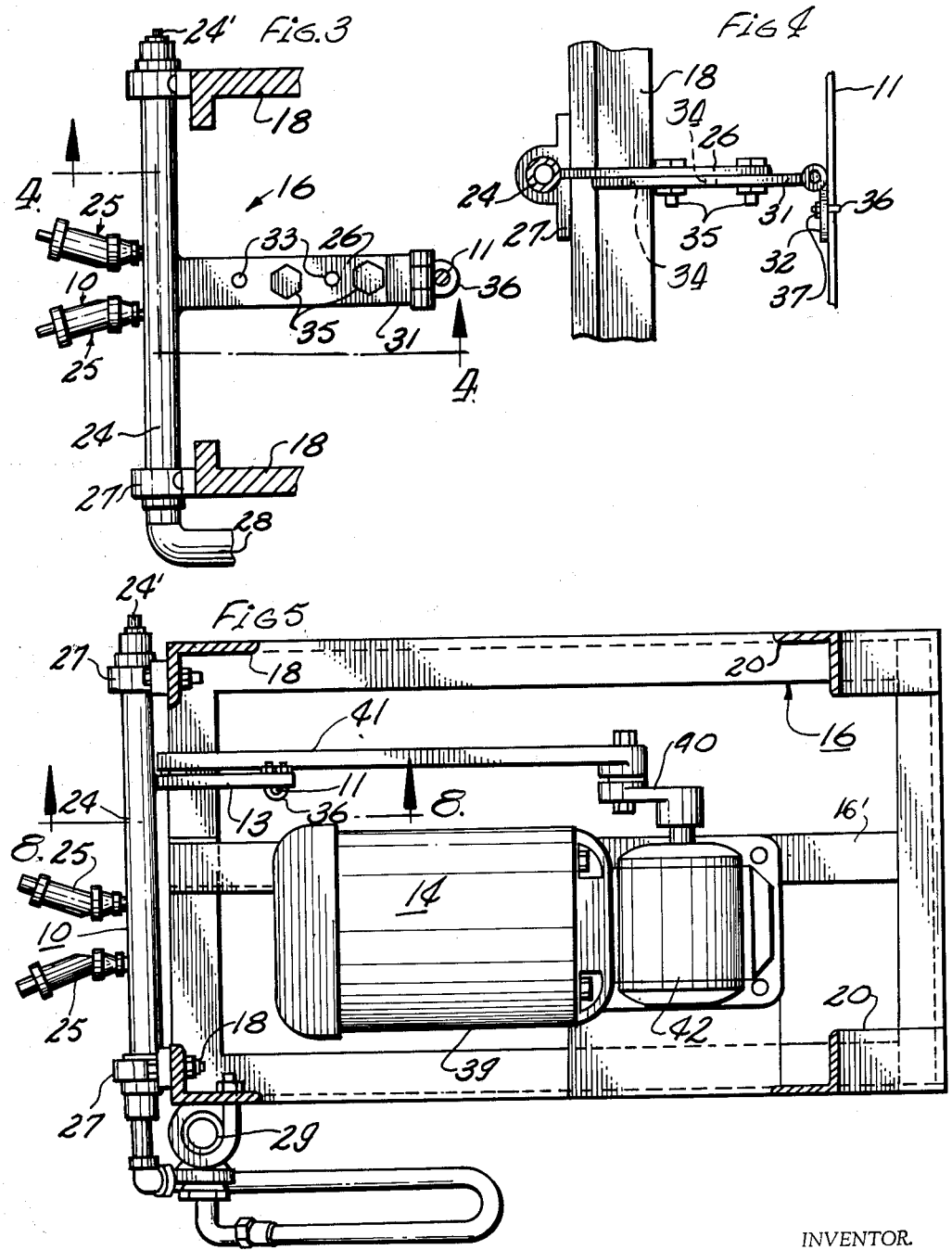
INVENTOR.
Francis J. Thiele
BY
Rummler and Snow
Att'ys

United States Patent Office 3,261,369
Patented July 19, 1966

---

3,261,369
VEHICLE CLEANING APPARATUS
Francis G. Thiele, Western Springs, Ill., assignor to Ross and White Company, Wheeling, Ill., a corporation of Illinois
Filed July 13, 1964, Ser. No. 382,211
6 Claims. (Cl. 134—123)

This invention relates to vehicle cleaning apparatus and more particularly to an improved apparatus for washing vehicles.

Heretofore the best mode of washing large vehicles, such as trucks, trailers, and railroad cars and engines was to employ apparatus which generally consisted of a fixed inverted U-shaped frame allowing the vehicle to move therethrough, and incorporating a series of spray nozzles completely encircling the frame and incorporating a series of additional spray nozzles located in an open channel extending between the lower ends of the frame. The spray nozzles are secured to a pair of endless cables for reciprocation. This elaborate system is excessively costly to operate and maintain, due to the stretching and/or wearing of the cable after being in use for awhile. This then requires each pair of spray nozzles to be refastened and set again on the cable causing a loss of use of the equipment during this change-over. This change-over is normally done by the manufacturer on complaint by the user thereby adding to the cost of equipment.

Also, and very serious, is the lack of provision for keeping the cable taut at all times during movement as well as taking up any deviation from the normal original length of the cable. It was to overcome and obviate the above disadvantageous features of known apparatus in the art that this invention was conceived.

The main objects of this invention are: to provide an improved structuring of equipment for the facile and effective exterior washing of vehicles; to provide an improved equipment of this kind wherein the vehicle to be washed is moved into and through the washing space, the equipment is activated to spray a cleansing fluid onto the sides and top of the vehicle from a series of reciprocating spray nozzle units; to provide an improved mechanism for effecting the reciprocation of the spray nozzle units; to provide improved equipment of this kind which may be structured for arrangement alongside and over the vehicle to be washed, either in fixed relationship or to be swung into and out of vehicle-washing position, as circumstances may require; and to provide a device of this character which is facile, extremely easy to operate and requires substantially no upkeep.

One specific embodiment is shown in the accompanying drawings in which:

FIGURE 1 is a front end view of vehicle washing equipment, constructed in accordance with this invention, in use position for cleaning a railroad car;

FIG. 2 is a somewhat enlarged, and partially broken away, front view of the right-hand portion of the equipment shown in FIG. 1;

FIG. 3 is an enlarged, fragmentary plan view of a part of the structure taken on the plane of the line 3—3 of FIG. 1;

FIG. 4 is an enlarged, transverse sectional view taken on the plane of the line 4—4 of FIG. 3;

FIG. 5 is an enlarged, cross-sectional view taken on the plane of the line 5—5 of FIG. 1;

FIG. 6 is a fragmentary detail view showing the pivotal connection at the lower end of FIG. 1 with one of the frames shifted 90° forward;

FIG. 7 is a cross sectional view taken on the line 7—7 of FIG. 2; and

FIG. 8 is a cross sectional view taken on the line 8—8 of FIG. 5.

The essential concept of this invention involves a vertically, and horizontally disposed frame, mounting a series of vertically- and horizontally-reciprocable spray nozzle units each attached between said frames and to a cable connected at one end to yieldable retracting-means and at the other end to a motor-driven reciprocating element.

A vehicle washing equipment embodying the foregoing concept comprises framework in the form of two, L-shaped sections 8 and 9 invertedly mounted on transversely-spaced supporting columns with a series of reciprocable spray-nozzle units 10 spaced along both legs of each frame section and attached to a cable 11 connected at one end to a tension spring 12 and at the other end to a bell-crank lever 13 actuated by a motor-drive 14.

As herein shown each L-shaped frame section 8 and 9 comprises an open rectangular-shaped base element 16 (FIG. 5), a similar rectangular-shaped top element 17 supported in their vetrically-spaced relationship by pairs of transversely-spaced parallel angle-bar posts 18. One of the lateral parts of each of the respective base and top elements 16 and 17 is secured at its outer end to the hollow frame supporting column 19, with an intermediate series of angle-bar trusses 20. Each hollow column 19 is rotatively supported on a rod or shaft 21 anchored at its lower end in a bearing 22. The bearing is anchored to plate 22' which in turn is anchored to the main support column 22" as shown in FIG. 6. The top element 17 is anchored to and extends inwardly from the upper end of the posts 18 whereto it is braced by angled trusses 23 and overhangs substantially half of the vehicle washing-space WS. This vehicle washing-space WS would be of a dimension to accommodate the type of vehicle customarily to be washed. Within the washing-space WS would be arranged directing guides G for ensuring the proper movement of the vehicle through such space. In the adaptation shown in FIG. 1 such guides G are rails for railroad vehicles and the broken lines represent a railroad car 43.

Each spray nozzle unit 10 comprises a section of tubing 24 (FIGS. 3 and 5), mounting a pair of spray heads 25 having communication with the tubing 24, and an apertured reciprocating bar 26 anchored to said tubing 24 medially of its ends. A series of these tube sections 24 is rotatively journaled, in predetermined spaced positions, on self-aligning pillow blocks 27 fixed to and along the vertical supporting posts 18 and along the under face of the top element 17 inwardly of the posts 18. At one end, each tubing section 24 has a watertight connection to one end of a hose 28. The other end of the tubing is plugged or capped as at 24'. Each hose 28, at its other end is connected to a fluid-supply conduit 29 fixed along the respective legs of the frame sections 8 and 9 and communicates with a suitable pressured fluid supply (not shown).

A reciprocating bar 26 is welded to each section of tubing 24 to extend radially outwardly opposite to the respective spray heads 25, and mounts a pair of hasp-type hinged arms 31 and 32. The bar 26 has a series of apertures 33 (FIG. 3) spaced therealong between the tube section 24 and the outer extremity of the bar.

The arm 31 has a similar series of apertures 34 which permits the bar 26 and arm 31 to be adjustably secured in functioning realtionship by fasteners 35. This makes possible spacing of the cable 11 relative to the axis of the spray-head tube section 24 to vary the angle of reciprocation of the spray heads 25. The arm 32 mounts a U-shaped fastener (such as a Crosby cable clamp) 36, with nuts 37, for clamping the cable 11 to the arm 32.

A cable 11, secured at its lower end to the bell-crank lever 13, extends longitudinally of the respective frame sections 8 and 9 and outwardly thereof. At its upper outer end, each cable 11 is attached to a spring 12 which, in turn, is attached to the innermost end of the transverse leg of the respective frame section or top 17. Such a spring 12 maintains a constant and uniform tension on the cable 11. This ensures a return pull on the cable 11 equal to the advance pull caused by the motor-drive 14.

The bell-crank lever 13, as here shown, is a triangular-shaped plate pivotally secured at 38 to the end of the pitman 41. The upper outer corner of the lever 13 is welded to a tube 24 medially of the ends of the tube. The tube 24 is seated in self-aligning pillow blocks 27′ and these are secured on one to each frame member 18, all as clearly shown in FIG. 7. The cable 11 is attached at the inner corner of the bell-crank lever 13 (see FIG. 8).

The motor-drive 14 comprises a conventional motor 39 of suitable horse-power mounted on a reduction gear box 42. The gear box 42 is fixed to the angle bar 16′. The armature driven crank 40 is pivotally connected to the pitman 41.

The operation of the herein-shown and explained vehicle-washing equipment is as follows:

In this adaptation, prior to the washing operation the frame sections 8 and 9 are in their normal outward position in a parallel relationship at the opposite sides of the washing-space WS, and remain there when the machine is not in use. This would be the inoperative position.

The vehicle to be washed then is moved into position for subsequent controlled travel through the washing-space WS. With the vehicle in such position, the frame sections 8 and 9 are swung into their opposed functioning or operating positions as shown in FIG. 1. Thereupon, the operation of the motor-drive 14 is started and the pressured source of fluid is opened to the spray nozzle units 10.

As the vehicle moves along the washing-space WS, at a predetermined rate of travel, the rocking of the bell-crank lever 13 effects a constant and uniform reciprocation of the spray nozzle units 10 to spray the fluid against the vehicle surfaces, as indicated by the dotted angle lines in FIG. 1. The degree of this angulation of the spray heads 25 can be altered by adjusting the position of the arms 31 on the bars 26 (FIGS. 3 and 4).

Since each of the tension springs 12 maintains the respective cable 11 taut against the action of the bell-crank lever 13 there is a synchronized and uniform angulation of the spray heads 25 to ensure application of the cleaning fluid over the entire surface of the vehicle passing through the washing-space WS.

It should be apparent that the columns 19 may be anchored directly to the piers P with the frames 8 and 9 maintained in operating stationary position at all times. This construction would be just as effective as the structure shown in the drawings provided the spray nozzle units 10 on frames 8 and 9 are positioned far enough away from the sides of the vehicle 43 to effectively wash the car.

Although but one specific embodiment of this invention is herein shown and described it will be understood that details of the construction shown may be altered or omitted without departing from the spirit of the invention as defined by the following claims.

I claim:
1. Vehicle-washing equipment comprising, a supporting column fixed on a pier, an L-shaped frame structured for mounting one leg thereof in vertical position on the supporting column for swinging horizontally into and out of functioning position, a plurality of spray nozzle units reciprocably attached to the frame in spaced relationship along both legs of the frame and respectively connected to pressured fluid source, a cable extending longitudinally along both legs of the frame and attached to each spray nozzle unit, normally retracted-yielding-means connecting one end of the cable to the adjacent end of the frame, and a motor-driven reciprocable element mounted adjacent the other end of the frame and connected to the other end of the cable for controlled operation with the normally-retracted retracting-means to cause the cable to effect the simultaneous reciprocation of the plurality of spray nozzle units.

2. Vehicle-washing equipment as set forth in claim 1 wherein the normally retracted-yielding-means is a tension spring and the motor-driven reciprocable element is a bell-crank lever with the two arms thereof connected respectively to the cable and to a motor-driven crank.

3. Vehicle-washing equipment as set forth in claim 1 wherein each frame supporting column is rotatively mounted on a shaft fixed in bearings mounted on a plate, and said plate being fixed to the main supporting column.

4. Vehicle-washing equipment as set forth in claim 1 wherein each nozzle unit comprises a section of tubing journaled in a pair of pillow-blocks fixed to the L-shaped frame, a bar fixed to each section of tubing and extending axially outward therefrom, and a pair of hinged arms one arm of which is adjustably attached to the bar and the other of which arms is clamped to the cable.

5. Vehicle-washing equipment comprising,
 (a) a pair of shafts, vertically-disposed in horizontally-spaced relationship,
 (b) a pair of frame supporting columns journaled on the respective shafts,
 (c) a pair of L-shaped frames each disposed in inverted position with the vertical legs attached to the respective frame supporting columns for swinging into and out of opposed vehicle-washing position,
 (d) a series of sections of tubing journaled in spaced positions along both legs of each frame, connected to a pressured fluid source, and having pairs of axially-disposed inwardly-extending spray jets,
 (e) a short bar fixed to each of the sections of tubing extending oppositely outward from the spray jets,
 (f) a pair of hinged arms one of which arms is adjustably attached to a bar with the other of which arms is disposed transverse to the respective bar,
 (g) a motor-driven bell-crank lever hinged adjacent the lower end of each of the vertical legs of the L-shaped frames,
 (h) a cable connected at one end to the bell-crank lever, and extending along both legs of each frame and connected to each of the other of the hinged arms, and
 (i) a tension spring connected to the other end of the cable and to the end of the other leg of each frame for normally retracting the cable against the action of the motor-driven bell-crank lever.

6. Vehicle-washing equipment comprising,
 (a) a pair of shafts, vertically-disposed in horizontally-spaced relationship,
 (b) a pair of frame supporting columns journaled on the respective shafts,
 (c) a pair of main supporting columns supporting said frame columns,
 (d) a pair of L-shaped frames each disposed in inverted position with the vertical legs attached to the respective frame supporting columns for swinging into and out of opposed vehicle-washing position,
 (e) a series of sections of tubing journaled in spaced positions along both legs of each frame, connected to a pressured fluid source, and having pairs of axially-disposed inwardly-extending spray jets,
 (f) a short bar fixed to each of the sections of tubing extending oppositely outward from the spray jets,
 (g) a pair of hinged arms one of which arms is adjustably attached to a bar with the other of which arms is disposed transverse to the respective bar, (h) a motor-driven bell-crank lever hinged adjacent the lower end of each of the vertical legs of the L-shaped frames, (i) a cable connected at one end to the bell-crank lever, and extending along both legs of each frame and connected to each of the other of the hinged arms, and (j) a tension spring connected to the other end of the cable and to the end of the other leg of each frame for normally retracting the cable against the action of the motor-driven bell-crank lever.

References Cited by the Examiner

UNITED STATES PATENTS

| 2,103,842 | 12/1937 | Drake | 134—45 |
| 2,221,876 | 11/1940 | Mackin | 134—45 |
| 3,009,469 | 11/1961 | Cunningham | 134—181 X |
| 3,190,297 | 6/1965 | Austin et al. | 134—181 X |

FOREIGN PATENTS 733,188  2/1943  Germany.

CHARLES A. WILLMUTH, *Primary Examiner.*

ROBERT L. BLEUTGE, *Assistant Examiner.*